(12) United States Patent
Beggs et al.

(10) Patent No.: US 7,387,475 B2
(45) Date of Patent: Jun. 17, 2008

(54) TOOL POSITIONING SYSTEM

(75) Inventors: Kevin W Beggs, Blackpool (GB); Paul E Jarvis, Preston (GB); Anthony J Douglas, Preston (GB); Carl J Abbott, York (GB)

(73) Assignee: Bae Systems plc, Farnborough, Hampshire (GB)

( * ) Notice: Subject to any disclaimer, the term of this patent is extended or adjusted under 35 U.S.C. 154(b) by 788 days.

(21) Appl. No.: 10/333,469

(22) PCT Filed: Jul. 4, 2001

(86) PCT No.: PCT/GB01/02994

§ 371 (c)(1),
(2), (4) Date: Jan. 21, 2003

(87) PCT Pub. No.: WO02/06003

PCT Pub. Date: Jan. 24, 2002

(65) Prior Publication Data
US 2003/0108395 A1     Jun. 12, 2003

(30) Foreign Application Priority Data
Jul. 19, 2000     (GB)     ................................. 0017684.2

(51) Int. Cl.
*B23B 41/00* (2006.01)
(52) U.S. Cl. .............................. 408/76; 408/77; 408/13
(58) Field of Classification Search .................. 408/76, 408/77, 13, 16; 83/745; 30/372; 451/92, 451/354, 439; 29/26 A, 57, 65; 409/182, 409/184, 218; 269/1, 21; 144/136.95
See application file for complete search history.

(56) References Cited

U.S. PATENT DOCUMENTS

| 2,415,877 | A | * | 2/1947 | Hajek ........................... 83/745 |
| 2,863,338 | A | * | 12/1958 | Stewart ........................ 408/76 |
| 3,371,257 | A | * | 2/1968 | Warren et al. ................. 318/39 |
| 3,915,241 | A | * | 10/1975 | Bieri ............................. 173/32 |
| 3,982,521 | A | * | 9/1976 | Bieri ........................ 125/16.01 |
| 4,095,378 | A | * | 6/1978 | Urakami ....................... 451/88 |
| 4,491,306 | A | * | 1/1985 | Eickhorst ...................... 269/21 |
| 4,527,783 | A | * | 7/1985 | Collora et al. ................. 269/21 |
| 4,591,301 | A |   | 5/1986 | Pelfrey |
| 4,700,488 | A | * | 10/1987 | Curti ............................ 33/613 |

(Continued)

FOREIGN PATENT DOCUMENTS

GB          2299772 A     10/1996

(Continued)

*Primary Examiner*—Monica S. Carter
*Assistant Examiner*—J Williams
(74) *Attorney, Agent, or Firm*—Nixon & Vanderhye P.C.

(57) ABSTRACT

Apparatus for positioning and holding a tool (3) relative to a workpiece (35) comprising a carriage (1) for conveying the tool over the surface of the workpiece (35) and means (7, 9, 11, 13) for holding the carriage (1) onto the surface of the workpiece (35), the holding means being selectively switchable between a low grip state in which the carriage (1) is held against the workpiece surface whilst remaining capable of movement relative thereto and a high grip state in which the carriage (1) is held substantially fixedly to the workpiece surface for the tool (3) in use to operate thereon. Such an arrangement provides a robot capable of "crawling" over a workpiece (35) and carrying out precise manufacturing operations thereon.

20 Claims, 2 Drawing Sheets

U.S. PATENT DOCUMENTS

Figure 2:
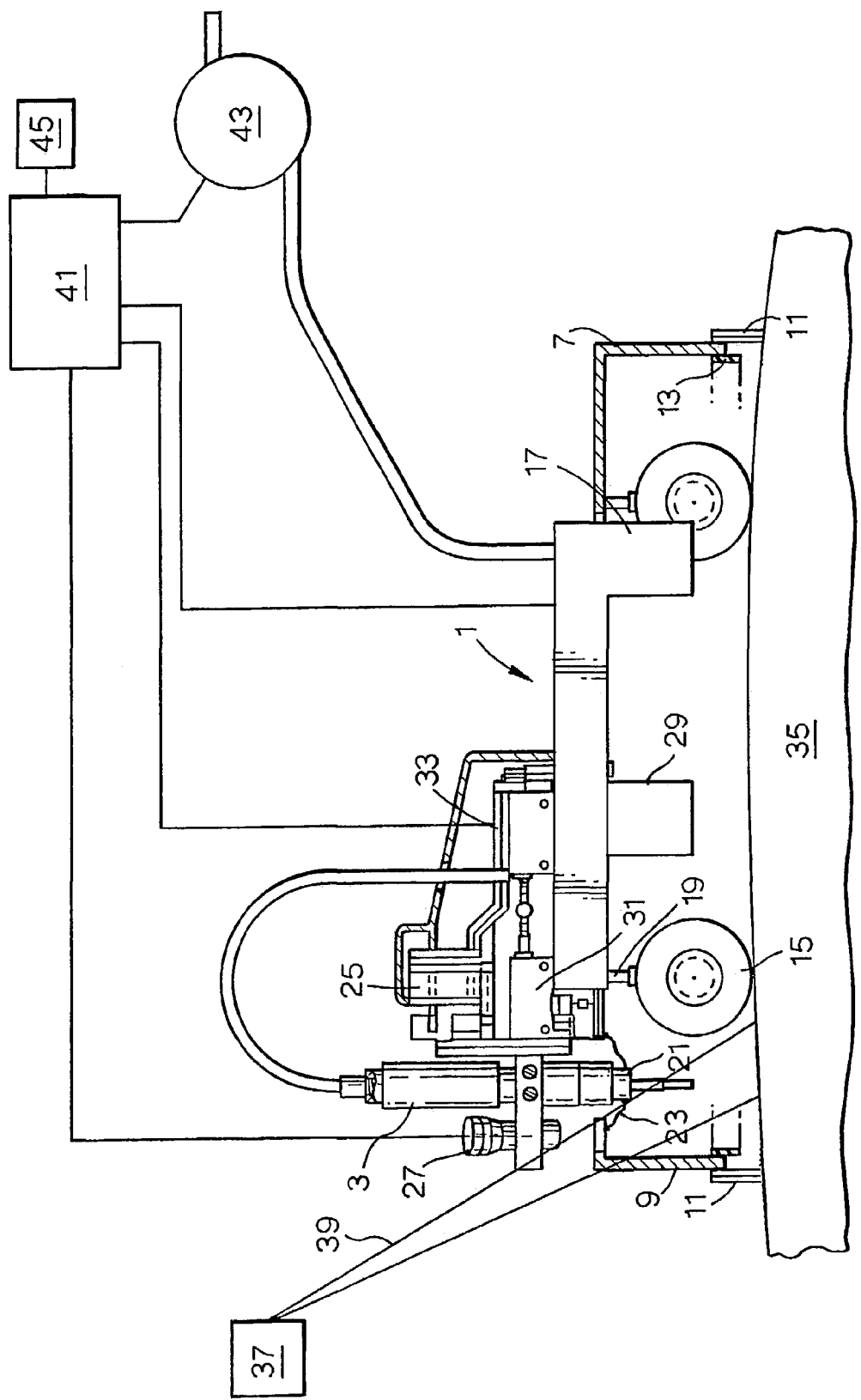

| | | | |
|---|---|---|---|
| 4,865,140 A * | 9/1989 | Cottam | 180/8.5 |
| 4,986,314 A | 1/1991 | Himmler | |
| 4,997,052 A * | 3/1991 | Urakami | 180/164 |
| 5,007,210 A * | 4/1991 | Urakami | 451/92 |
| 5,203,547 A * | 4/1993 | Marumo | 269/21 |
| 5,240,359 A * | 8/1993 | Backhouse | 409/178 |
| 5,249,785 A * | 10/1993 | Nelson et al. | 269/21 |
| 5,317,803 A * | 6/1994 | Spigarelli et al. | 29/840 |
| 5,383,751 A * | 1/1995 | Wheetley et al. | 408/1 R |
| 5,414,617 A * | 5/1995 | Pomerleau et al. | 700/11 |
| 5,427,363 A * | 6/1995 | Rink et al. | 269/21 |
| 5,433,657 A * | 7/1995 | Bovone | 451/388 |
| 5,457,868 A * | 10/1995 | Blaimschein | 29/559 |
| 5,468,099 A * | 11/1995 | Wheetley et al. | 408/1 R |
| 5,485,988 A * | 1/1996 | Nobilec | 269/21 |
| 5,542,726 A * | 8/1996 | Ozawa | 294/64.1 |
| 5,633,707 A | 5/1997 | Seemann | |
| 5,722,646 A * | 3/1998 | Soderberg et al. | 269/20 |
| 5,971,257 A * | 10/1999 | Yang | 228/212 |
| 6,042,095 A * | 3/2000 | Kuchta et al. | 269/21 |
| 6,112,663 A * | 9/2000 | Ulrich et al. | 101/389.1 |
| 6,129,489 A * | 10/2000 | Linderholm | 409/178 |
| 6,173,648 B1 * | 1/2001 | Misono et al. | 101/474 |
| 6,182,957 B1 * | 2/2001 | Becker | 269/21 |
| 6,217,013 B1 * | 4/2001 | Foreman | 269/21 |
| 6,244,189 B1 * | 6/2001 | Kingsley | 104/119 |
| 6,446,948 B1 * | 9/2002 | Allen | 269/21 |
| 6,467,385 B1 * | 10/2002 | Buttrick et al. | 83/745 |
| 6,540,001 B1 * | 4/2003 | McNestry | 156/541 |
| 6,585,244 B2 * | 7/2003 | Goeckel et al. | 269/21 |
| 6,598,866 B2 * | 7/2003 | Helm et al. | 269/21 |
| 6,702,268 B1 * | 3/2004 | Nascimben | 269/21 |
| 2001/0020762 A1 * | 9/2001 | Helm et al. | 269/21 |
| 2002/0074704 A1 * | 6/2002 | Goeckel et al. | 269/21 |

FOREIGN PATENT DOCUMENTS

| | | | |
|---|---|---|---|
| JP | 58 120467 A | | 7/1983 |
| JP | 60 219172 A | | 11/1985 |
| JP | 60219172 A | * | 11/1985 |
| JP | 63 079059 A | | 4/1988 |
| JP | 01246039 A | * | 10/1989 |
| WO | 90/14199 | | 11/1990 |

* cited by examiner

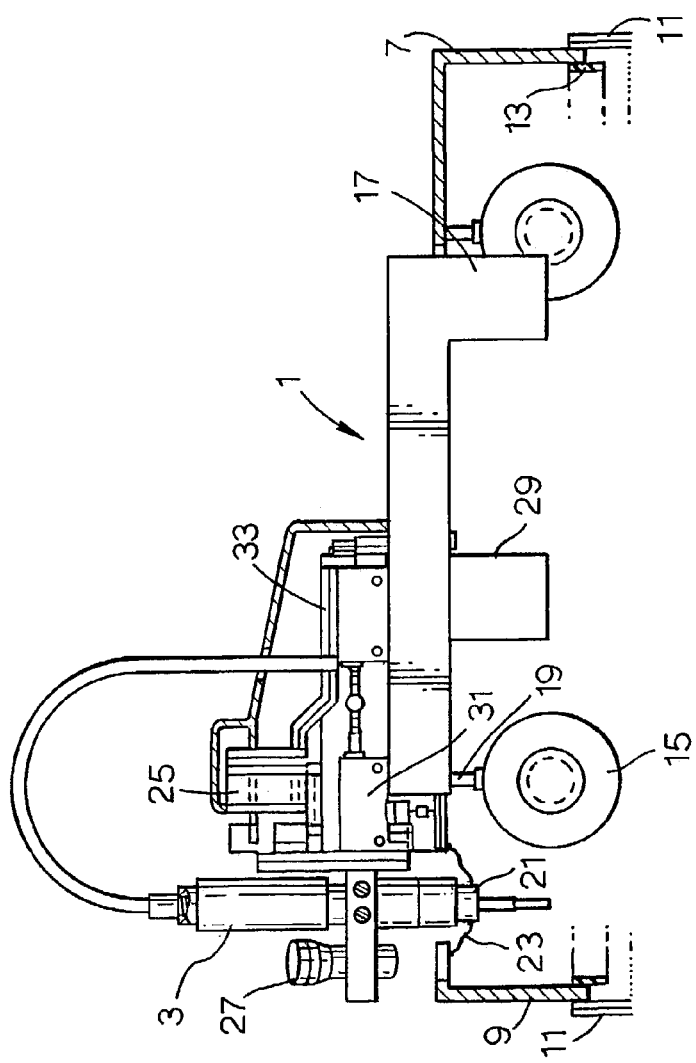
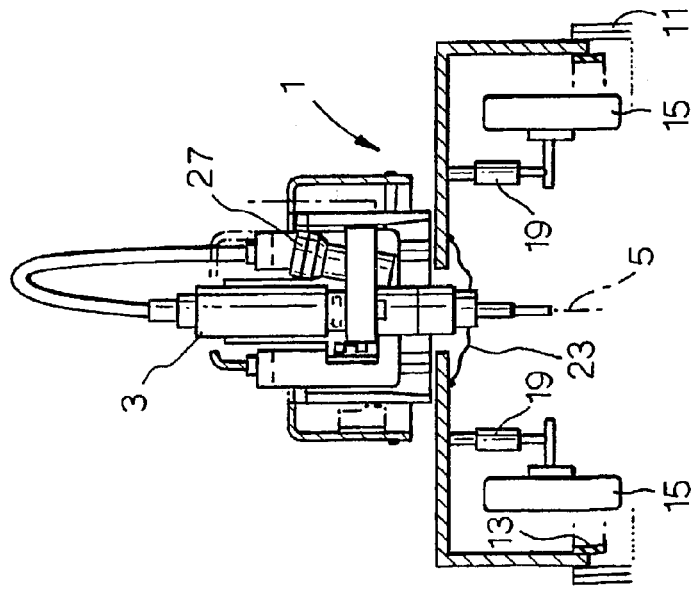

TOOL POSITIONING SYSTEM

This application is the US national phase of international application PCT//GB01/02994 filed 4 Jul. 2001 which designated the U.S.

This invention relates to the positioning and holding of a tool relative to a workpiece on which the tool is intended to carry out one or more operations, and is particularly but not exclusively related to manufacturing.

In manufacturing industry it is common to carry out such manufacturing operations on workpieces as measuring, drilling, milling, cutting, countersinking and inspecting; tools for such operations are well known in the art and form no part of the present invention per se, however the terms "tool" and "tools" as used hereinafter should be understood to embrace all such apparatus for performing any such operation.

The accuracy with which such tools are positioned is dependent upon the level of accuracy required in the finished product. In applications in which a high degree of accuracy is required, such as the aircraft industry, a significant proportion of the manufacturing time and cost is accounted for by the need to ensure that tools are accurately positioned relative to the workpiece in order that a number of manufacturing operations can be performed with accuracy and at precisely defined locations on the surface of the workpiece. In conventional manufacturing, tools are located by hand with the assistance of jigs and fixtures, which are costly and complicated items in themselves. Alternatively, tools may be located by robot arms, however such methods are costly and inherently inaccurate, particularly where the workpiece is large and requires successive tool operations to be carried out over a large area.

Accordingly, the present invention provides an apparatus for positioning and holding a tool relative to a workpiece comprising a carriage for conveying the tool over the surface of the workpiece and means for holding the carriage onto the surface of the workpiece, the holding means being selectively switchable between a low grip state in which the carriage is held against the workpiece surface whilst remaining capable of movement relative thereto and a high grip state in which the carriage is held substantially fixedly to the workpiece surface for the tool in use to operate thereon.

Such an arrangement enables a manufacturing tool to be moved over the surface of a workpiece between precisely predetermined positions thereon in order to perform the desired manufacturing operations whilst maintaining the necessary level of accuracy; the carriage simply moves the tool to the location on the workpiece where the next operation is to be carried out, and the holding means switch to the high grip state so as to hold the tool in a fixed spatial relationship with the workpiece surface so that the desired manufacturing operation can be accurately performed. As will be appreciated such apparatus can be designed so as to be compact and relatively inexpensive when compared with the cost of traditional jig-based tool positioning methods. Moreover, more than one such apparatus may be used on a workpiece at one time, something not normally possible with traditional techniques, thus reducing manufacturing times.

The function of the holding means in the low grip state is to hold the carriage against the workpiece whilst it is moving, and the tool is not performing a manufacturing operation, so that the apparatus can "roam" over the entire surface of the workpiece, whether that surface be at a steep angle, or even inverted, without becoming detached from the surface. Clearly the attractive force exerted by the holding means to hold the carriage onto the workpiece surface in the low grip state must be approximately equal to the overall weight of the apparatus.

When the holding means is in the high grip state, the tool is held in a substantially fixed spatial relationship with the workpiece, but at least part of the tool (such as the drill bit, in the case where the tool is a drill) should be movable in order to perform its intended function on the workpiece. The attractive force exerted by the holding means in the high grip state must exceed that in the low grip state by an amount sufficient to exceed any forces likely to be generated by the tool when performing its function on the workpiece which would act to separate the carriage from the workpiece surface.

In order to move the tool relative to the workpiece, the carriage preferably comprises one or more elements held in frictional contact with the workpiece surface by the holding means and adapted, when the holding means is in the low grip state, to move the carriage over the workpiece surface.

The elements many comprise one or more wheels, with associated conventional drive and steering mechanisms, or indeed any alternative arrangement capable of engaging with the workpiece surface in order to move the carriage relative thereto, such as caterpiller tracks. The frictional arrangement between the elements may be adjusted in any conventional manner so as to provide the optimum drive for the carriage consist with the requirement not to cause damage to the workpiece surface; the coefficient of friction between the element(s) and the workpiece surface may be adjusted by providing tread patterns or suction cups to the wheels/tracks, for example.

The holding means may comprise a vacuum system (suitably comprising a high flow, low pressure vacuum pump arranged to evacuate a plenum chamber adapted to seal against the workpiece surface) or a magnetic/electromagnetic system, according to the nature of the workpiece; for most aerospace applications the workpiece would not normally be ferromagnetic and therefore a vacuum system would be most appropriate, however a magnetic system would be appropriate in applications such as shipbuilding where large numbers of repeat operations (such as drilling) need to be performed at different locations on ferromagnetic (frequently steel) workpieces.

The holding means and/or the carriage is/are preferably adapted to conform to the surface configuration of the workpiece immediately adjacent thereto when the holding means is in the low grip state.

Such an arrangement, whereby the apparatus conforms to the adjacent surface of the workpiece as the apparatus moves thereover is necessary where the surface of the workpiece has a curved or complex configuration; it is also advantageous in assisting the holding means in ensuring that the apparatus remains in contact with, and does not separate from or fall off, the workpiece as the apparatus moves over its surface. For a holding means operating on a vacuum principle, this may be achieved by providing a brush type seal around the circumference of the vacuum plenum, where it abuts the workpiece surface. Conventional suspension units applied to the carriage would enable it to conform to the workpiece surface configuration.

The holding means and/or the carriage may, additionally or alternatively, be adapted to conform to the surface configuration of the workpiece immediately adjacent thereto when the holding means is in the high grip state.

When the holding means is switched to the high grip state, to ensure that the apparatus is firmly clamped to the workpiece surface it is important that there be no movement of the holding means or the carriage which might affect the accuracy of the tool operation. In the case of a vacuum system, the provision of a flexible rubber seal or the like would enhance the clamping of the apparatus to the workpiece in the high grip state, as compared with a brush type seal, which would be more suitable for clamping in the low grip state.

The apparatus preferably comprises means for sensing the position of the carriage and/or the tool relative to the workpiece, and directing means adapted to control the carriage in order to move the carriage over the workpiece surface between pre-determined positions thereon.

Such a positioning arrangement facilitates the accurate positioning of the tool and reduces the time required to carry out repeated tool operations by enabling the system to be operated with a minimum of manual intervention by an operator. This positioning arrangement is preferably of the type comprising a radiation source for projecting an image onto the workpiece, surface, a radiation detector for detecting the projected image, and processor means for calculating at least two-dimensional co-ordinates of the projected image detected by the radiation detector relative to the tool, the directing means adapted to control movement of the carriage so as to position the tool in a predefined spatial relationship with the projected image in response to a signal from the processor means.

The radiation source may be a laser. Advantageously the radiation source provides radiation visible to the human eye so that an operator may view the image. The radiation source may be for example a Virtek Laseredge 3D laser protection system.

The radiation source may project an image in the form of an ellipse. The radiation source may alternatively project an image in the form of a cross, or a circle. The image is preferably of a size in the range 0.5 to 3.0 cm.

The image is projected onto a surface at a location where a manufacturing operation is to be carried out. Several images may be projected simultaneously to provide, for example, a drill template on a surface such as an aircraft panel.

The radiation detector preferably comprises a camera and an image processing system. The camera may comprise an array of solid state charge coupled devices (CCDs). The array may be linear or rectangular. The CCDs produce a charge proportional to the amount of light falling on them and the charge from each device in the array is preferably used by the image processing system to build up an image.

The image processing system preferably comprises a frame grabber for digitising the image and a computer adapted for processing the image. The image is advantageously processed by the computer to identify features such as areas of the same intensity or changes in intensity, for example. The image processor advantageously is thereby able to identify an image, such as a cross, projected by the radiation source, and to locate the centre of the image.

There may also be provided means for sensing the position of the tool relative to the workpiece surface and means for moving at least part of the tool relative to the carriage along at least two orthogonal axes. This will enable very accurate positioning of the tool relative to the workpiece. The axes could be x and y axes coplanar with the adjacent surface of the workpiece, and in particular that part of the workpiece surface where the tool operation is to be performed. The moving means may comprise an electrical servo motor actuated moveable stage. A motion control system could be used to control the electrical servos, with optical encoders being used to provide positional feedback. The moving means may also be adapted to move the tool or part thereof along the z axis.

In addition to accurately positioning the tool relative to the workpiece it will usually be necessary to ensure that the tool is oriented at the correct angle relative to the workpiece surface (for example, to ensure that a drill bores perpendicularly through a curved plate). Accordingly, the apparatus may comprise means for sensing the angular orientation of at least part of the tool relative to the workpiece surface and means for rotating at least part of the tool about at least one axis to adjust said angular orientation. Ideally, the arrangement would measure the angle of the tool (or, more usually, the tool bit) relative to the workpiece surface, determine what movement is required about the x and y axes (coplanar with the surface) is needed to bring the tool into the desired angular orientation relative to the surface and then effect rotation in roll and/or pitch to achieve the desired orientation (which in many cases will be with the tool bit normal to the surface).

The directing means is preferably adapted to control movement and rotation effected by the moving means and the rotating means, respectively, such that the tool reaches a predetermined position and/or orientation relative to the surface of the workpiece, and to actuate the tool.

The apparatus may comprise a programmable controller adapted to control the directory means and to switch the holding means between the low and high grip states in order automatically to convey the carriage and to position and orient the tool between predetermined locations and orientations relative to the workpiece surface, and to actuate the tool in order to carry out one or more predetermined tool operations on the workpiece. Preferably the controller is programmable so as automatically to carry out different sequences of predetermined tool operations on a workpiece and/or to carry out different sequences of predetermined tool operations on a variety of different workpieces.

Such arrangements reduce the requirement for human intervention whilst tool operations are carried out, by making the process substantially automated, and enable the use of several tool positioning apparatus on a workpiece at one time, hence improving manufacturing productivity.

The invention will now be described by way of example and with reference to the accompanying drawings, in which:

FIGS. 1a and 1b are schematic, partially cross-sectional front and side elevation views, respectively, of an embodiment of an apparatus in accordance with the invention, and FIG. 2 is a schematic diagram of the apparatus of FIGS. 1a and 1b in use.

FIGS. 1a and 1b show a carriage 1 to which is mounted a tool 3 (a drill having a bit 5 is illustrated). The carriage 1 is substantially covered and surrounded by a vacuum cup 7, at least part 9 of which is transparent, for reasons to be described below. Around the circumferential edge of the vacuum cup 7 is mounted a seal 11 in the form of a brush skirt and another seal 13 in the form of a rubber skirt; note that the brush skirt seal 11 is longer than, and therefore extends further from the vacuum cup 7 than, rubber skirt seal 13. The brush skirt seal 11 and the rubber skirt seal 13 are preferably mounted so as to conform with the configuration of the surface upon which the carriage rests, in much the same manner as the carbon fibre "ground effect skirts" in use in Formula One motor racing some years ago—as will be further described below.

Substantially enclosed within vacuum cup 7 are two pairs of wheels 15, at least one pair of which are driveable and/or steerable (as illustrated in FIG. 1b, the right hand pair of wheels are driven and steered by drive unit 17); wheels 15 have a rolling surface formed of an elastic compound, so as to provide good frictional engagement with the surface the carriage rolls over, whilst preventing damage thereto. Wheels 15 are also provided with conventional suspension units 19 so as to allow each wheel to reciprocate independently in the vertical direction of the drawings.

Around part of the drill 3 is a rotary, vacuum seal 21, which is sealingly connected to vacuum cup 7 by a flexible diaphragm 23, so ensuring that the vacuum cup 7 extends in substantially unbroken fashion over its entire surface area, whilst allowing drill 3 to move along 3 orthogonal axes relative to vacuum cup 7 (and allowing drill bit 5 to rotate about one of these axes). Moving means 25 which is rigidly mounted to the carriage 1 is adapted to move the drill 3 along these three axes, so as to move the drill 3 left and right as shown in the drawing, into and out of the plane of the drawing, and up and down as in the drawing.

A camera 27 is clamped to the drill 3 so as to move therewith, and is adjusted so as to receive an image of the end of the drill bit 5. Normalisation sensors 29 (only one is shown, in FIG. 1b) are mounted to the carriage 1 and are adapted so as to sense the angular orientation of the carriage 1, and particularly the drill bit 5, relative to the surface on which the carriage 1 rests (not shown, for clarity) and into which a drilling operation is to be carried out. Rotating means 31 is rigidly mounted to the carriage 1 and is adapted to rotate the drill 3 about two orthogonal axes substantially coplanar with the surface upon which the carriage rests, so as to ensure that the drill bit 5 is normal to the surface into which it is to drill, or so as to enable the drill bit 5 to drill at any desired angle other than normal into the surface. Control unit 33; which suitably comprises a microprocessor unit and a combined power source, powers and controls the operation of the drill 3, drive unit 17, moving means 25 and rotating means 33, as will be further described below.

In use, carriage 1 is intended to move with a minimum of operator intervention over the surface of a workpiece (not shown), so as to move the tool 3 into an accurate position and orientation in order to carry out a precise manufacturing operation. In order to hold the carriage 1 onto the surface of the workpiece and to prevent it from falling off as it moves around the workpiece, the interior of the vacuum cup 7 is at least partially evacuated, forming a vacuum plenum, so that ambient air pressure holds the carriage 1 against the workpiece. The brush skirt seal 11 acts as the seal between the vacuum cup 7 and the workpiece, and is sufficiently flexible and/or flexibly mounted to conform to the surface configuration of the workpiece. Nevertheless, as the seal 11 is essentially formed of a plurality of bristles which form an imperfect seal, so that ambient air can permeate the seal—in a controlled manner—the force clamping the carriage 1 to the surface is not so great as to prevent the wheels 15 from moving the carriage. Ideally, the brush skirt seal 11 and the low pressure within the vacuum cup 7 are designed so that, when the carriage needs to move, the net force clamping the carriage 1 to the workpiece is not much more that the weight of the carriage. When the carriage 1 is in approximately the correct position, the evacuation of the vacuum cup 7 is increased, compressing the brush skirt seal 11 and the suspension units 19 and bringing the rubber skirt seal 13 into contact with the surface of the workpiece. The rubber skirt seal 13 is similarly flexible and/or flexibly mounted as is the brush skirt seal 11, so as to confirm to the surface configuration of the workpiece. However, the rubber skirt seal 13 is substantially impermeable, so that the seal between the vacuum cup 7 and the surface of the workpiece is substantially airtight; as a result, the carriage 1 is very firmly clamped to the workpiece. The low pressure within the vacuum cup 7 is controllable so as to ensure that the carriage 1 is unmoved by the forces, additional to its own weight, arising from the fine positioning of the tool 3 and, more particularly, from the operation of the tool when drilling is taking place.

When the carriage 1 is clamped onto the workpiece, the tool 3 and the drill bit 5 are accurately positioned and orientated by way of the moving means 25 and the rotating means 31, as will now be described with reference to FIG. 2, which illustrates the carriage 1 located on the surface of an aircraft component 35, approximately in position for a drilling operation to be carried out and immediately before the carriage 1 is firmly clamped to the component 35.

A laser projector 37 is positioned to project a beam of radiation 39 onto the component 35 so as to project a cross shape which precisely defines the position where a drilling operation is required. Because at least the front portion 9 of the vacuum cup 7 is transparent, the cross is projected onto the surface of the component 35. The cross appears within the field of view of the camera 27, which then sends a signal to controller 41, indicating that the carriage 1 is approximately positioned.

On receipt of this signal, controller 41 sends signals halting the drive means 17 and to a high flow low pressure vacuum pump 43, so halting movement of carriage 1 and initiating the increased evacuation of vacuum cup 7 so as to clamp carriage 1 firmly to the component 35 (as described above).

Controller 41 then analyses the signal from camera 27 in order to assess the precise location of the drill bit in relation to the laser cross projected onto the component and signals control unit 33 to actuate moving means 25 in order precisely to position the business end of the drill bit 5 relative to the projected cross, which is precisely aligned on the spot where a drilling operation is required.

Controller 41 then interrogates normalisation sensors 29 (for clarity, no functional connection between controller 41 and normalisation sensor 29 is depicted) to ascertain the angular orientation of the drill bit 5 relative to the component surface; this measured orientation is compared with orientation data pre-programmed into controller 41 defining the precise angular orientation of the desired drilling, and controller 41 signals control unit 33 to actuate rotating means 31 in order precisely to orientate the angle of the drill bit 5 relative to the surface to be drilled.

Once the drill bit is accurately positioned and orientated, controller 41 signals control unit 33 to initiate the drilling operation, by switching the drill 3 on and moving the drill 3 along the axis of the drill bit 5 as drilling occurs for a distance equal to the desired drilling depth.

At any time, data may be input to the controller 41 by way of an operation interface 45.

Now that a specific embodiment of the invention has been described, numerous modifications and variations will immediately spring to the minds of those skilled in the art. For example, the controller 41 and pump 43 may either be remote or affixed to the carriage 1 for greater compactness (and the controller 41 and control unit 33 may comprise a single integrated microprocessing unit); the interface 45 might comprise a keyboard and might also be located on the carriage 1, or it might comprise a remote infra-red or microwave linkage or the like.

The vacuum cup 7 depicted is in the form of a rectangular box—this could be of any shape provided it has a circumferential edge at least loosely configured so as to conform to the surface of the workpiece; it could, for example, be toroidal in shape with the manufacturing operation being performed through the central opening thereof, or it could comprise a plurality of small vacuum cups of any shape. The vacuum system described could be complemented by, or replaced with, any means capable of providing a variable attractive force, such as an electromagnetic device, or even a system employing a releasable adhesive arrangement.

The illustrated embodiment incorporates a drill, for performing a drilling operation, however the drill could be replaced by any other conventional tool for performing other manufacturing operations, or operations such as welding, testing, painting, testing or other localised treatment.

The laser projector 37 could be replaced by any comparable accurate positioning arrangement, and the entire system could be automated so as to require a minimum of operator intervention.

The invention claimed is:

1. Apparatus for positioning and holding a tool relative to a workpiece, said apparatus comprising:
    a carriage for conveying the tool over the surface of the workpiece; and
    means for holding the carriage onto the surface of the workpiece, the holding means selectively switchable between a low grip state and a high grip state, said low grip state is when the carriage is moveably held against the workpiece surface and said high grip state is when the carriage is fixedly held against the workpiece surface for tool operation on said workpiece surface.

2. Apparatus according to claim 1 wherein the carriage comprises at least one element held in frictional contact with the workpiece surface by the holding means and adapted, when the holding means is in the low grip state, to move the carriage over the workpiece surface.

3. Apparatus according to claim 1 wherein at least one of the holding means and the carriage conforms to the surface of the workpiece immediately adjacent thereto when the holding means is in the low grip state.

4. Apparatus according to claim 1 wherein at least one of the holding means and the carriage conforms to the surface of the workpiece immediately adjacent thereto when the holding means is in the high grip state.

5. Apparatus according to claim 1 further comprises:
    means for sensing the position of at least one of the carriage and the tool relative to the workpiece, and
    directing means for moving the carriage over the workpiece surface between predetermined positions thereon.

6. Apparatus according to claim 1 further comprising:
    means for sensing the position of the tool relative to the workpiece surface; and
    means for moving at least part of the tool relative to the carriage along at least two orthogonal axes.

7. Apparatus according to claim 1 further comprising:
    means for sensing the angular orientation of at least part of the tool relative to the workpiece surface and
    means for rotating at least part of the tool about at least one axis to adjust said angular orientation.

8. Apparatus for positioning and holding a tool relative to a workpiece, said apparatus comprising:
    a carriage for conveying the tool over the surface of the workpiece;
    means for holding the carriage onto the surface of the workpiece, the holding means selectively switchable between a low grip state and a high grip state, said low grip state is when the carriage is moveable held against the workpiece surface and said high grip state is when the carriage is fixedly held against the workpiece surface for tool operation on said workpiece surface;
    means for sensing the position of the carriage relative to the workpiece;
    directing means for moving the carriage over the workpiece surface between predetermined positions thereon;
    means for sensing the position of the tool relative to the workpiece surface; and
    tool moving means for moving at least part of the tool relative to the carriage along at least two orthogonal axes, wherein the directing means controls said tool moving means to move said tool to at least one of a predetermined position and orientation relative to the surface of the workpiece, and actuates the tool.

9. Apparatus for positioning and holding a tool relative to a workpiece, said apparatus comprising:
    a carriage for conveying the tool over the surface of the workpiece;
    means for holding the carriage onto the surface of the workpiece, the holding means selectively switchable between a low grip state and a high grip state, said low grip state is when the carriage is moveable held against the workpiece surface and said high grip state is when the carriage is fixedly held against the workpiece surface for tool operation on said workpiece surface;
    means for sensing the position of the carriage relative to the workpiece;
    directing means for moving the carriage over the workpiece surface between predetermined positions thereon,
    means for sensing the angular orientation of at least part of the tool relative to the workpiece surface; and
    tool moving means for rotating at least part of the tool about at least one axis to adjust said angular orientation, wherein the directing means controls said tool moving means to move said tool to at least one of a predetermined position and orientation relative to the surface of the workpiece, and actuates the tool.

10. Apparatus according to claim 8 further including a programmable controller for controlling the directing means and for switching the holding means between the low and high grip states in order automatically to move the carriage and to position and orient the tool between predetermined locations and orientations relative to the workpiece surface, and for actuating the tool in order to carry out at least one predetermined tool operation on the workpiece.

11. Apparatus according to claim 10 wherein the controller is programmable so as automatically to carry out different sequences of predetermined tool operations on a workpiece.

12. Apparatus according to claim 10 wherein the controller is programmable so as automatically to carry out different sequences of predetermined tool operations on a variety of different workpieces.

13. Apparatus according to claim 9 further including a programmable controller for controlling the directing means and for switching the holding means between the low and high grip states in order automatically to move the carriage and to position and orient the tool between predetermined locations and orientations relative to the workpiece surface, and for actuating the tool in order to carry out at least one predetermined tool operation on the workpiece.

14. Apparatus according to claim 13 wherein the controller is programmable so as automatically to carry out different sequences of predetermined tool operations on a workpiece.

15. Apparatus according to claim 14 wherein the controller is programmable so as automatically to carry out different sequences of predetermined tool operations on a variety of different workpieces.

16. Apparatus according to claim 2 wherein at least one of the holding means and the carriage conforms to the surface of the workpiece immediately adjacent thereto when the holding means is in the low grip state.

17. Apparatus according to claim 2 wherein at least one of the holding means and the carriage conforms to the surface of the workpiece immediately adjacent thereto when the holding means is in the high grip state.

18. Apparatus according to claim 2 further comprising:
means for sensing the position of at least one of the carriage and the tool relative to the workpiece; and
directing means for moving the carriage over the workpiece surface between predetermined positions thereon.

19. Apparatus according to claim 2 further comprising:
means for sensing the position of the tool relative to the workpiece surface; and
means for moving at least part of the tool relative to the carriage along at least two orthogonal axes.

20. Apparatus according to claim 2 further comprising:
means for sensing the angular orientation of at least part of the tool relative to the workpiece surface; and
means for rotating at least part of the tool about at least one axis to adjust said angular orientation.

* * * * *